(12) United States Patent
Betensky et al.

(10) Patent No.: US 8,537,262 B2
(45) Date of Patent: Sep. 17, 2013

(54) BINOCULAR VIEWING DEVICE

(75) Inventors: Ellis Betensky, Toronto (CA); Klaus G. Raschke, Weston, FL (US); Alexander Raschke, Weston, FL (US)

(73) Assignee: Pocket Optics Development Corporation, New York, NY (US)

( * ) Notice: Subject to any disclaimer, the term of this patent is extended or adjusted under 35 U.S.C. 154(b) by 262 days.

(21) Appl. No.: 13/131,068

(22) PCT Filed: Nov. 24, 2009

(86) PCT No.: PCT/US2009/065678
§ 371 (c)(1),
(2), (4) Date: May 25, 2011

(87) PCT Pub. No.: WO2010/062887
PCT Pub. Date: Jun. 3, 2010

(65) Prior Publication Data
US 2011/0228137 A1    Sep. 22, 2011

Related U.S. Application Data

(60) Provisional application No. 61/118,303, filed on Nov. 26, 2008.

(51) Int. Cl.
*G02B 13/16* (2006.01)
*H04N 5/225* (2006.01)

(52) U.S. Cl.
USPC .................. 348/335; 348/333.01; 348/345

(58) Field of Classification Search
USPC .................................................. 348/335
See application file for complete search history.

(56) References Cited

U.S. PATENT DOCUMENTS

| 5,015,081 | A | 5/1991 | Kitajima et al. |
|---|---|---|---|
| 5,335,110 | A | 8/1994 | Shin |
| 5,371,626 | A | 12/1994 | Betensky |
| 5,729,382 | A | 3/1998 | Morita et al. |
| 5,880,881 | A | 3/1999 | Ito et al. |
| 6,118,578 | A * | 9/2000 | Hall .............................. 359/356 |
| 6,373,640 | B1 | 4/2002 | Betensky et al. |
| 6,704,141 | B1 | 3/2004 | Nowak et al. |
| 7,061,674 | B2 | 6/2006 | Mogamiya |
| 7,164,528 | B2 | 1/2007 | Mogamiya |
| 7,202,999 | B2 | 4/2007 | Mogamiya |
| 7,511,896 | B2 * | 3/2009 | Edwards ....................... 359/744 |
| 2003/0063209 | A1 | 4/2003 | Enomoto et al. |

OTHER PUBLICATIONS

PCT International Search Report for PCT/US2009/065678, dated Sep. 3, 2010.
PCT Written Opinion for PCT/US2009/065678, dated Sep. 3, 2010.
PCT International Preliminary Report on Patentability for PCT/US2009/065678, dated May 31, 2011.
Liansheng An, article in "Applied Optics", published Mar. 31, 2002, pp. 90-93.

* cited by examiner

*Primary Examiner* — Anthony J Daniels
(74) *Attorney, Agent, or Firm* — White & Case LLP

(57) ABSTRACT

An optical device for viewing distant objects. The device includes an objective system and at least one ocular and achieves a magnifying power of greater than 0.6 mm$^{-1}$ times the entrance pupil diameter in millimeters with an exit pupil of at least 2 mm. Images from the objective system are detected by a sensor, processed and recorded. The images are displayed on a display which is observed by the user through one or more oculars. The optical device works well at low light levels. The device also has a slide mechanism for adjusting the interpupillary distance between the oculars.

12 Claims, 13 Drawing Sheets

FIG. 2C
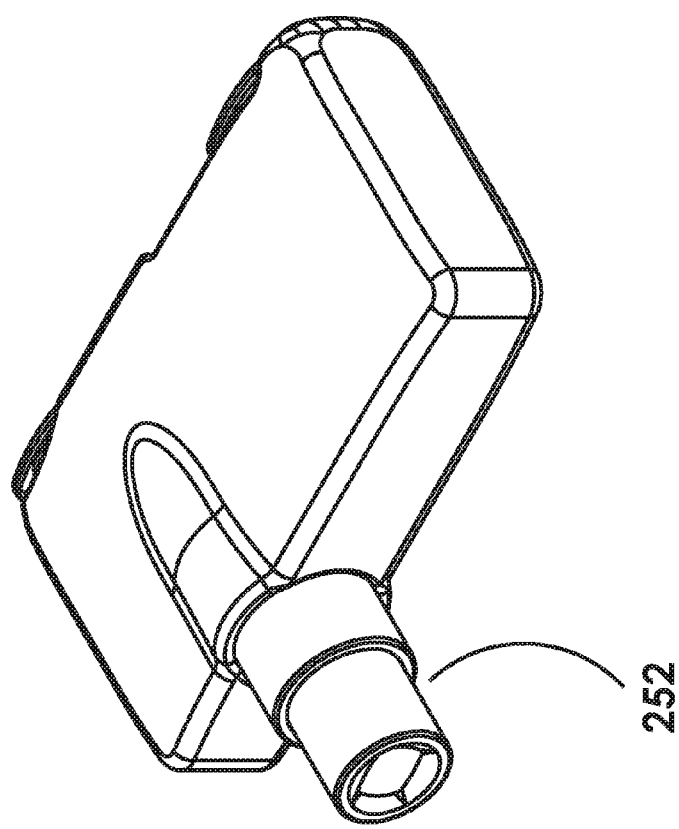
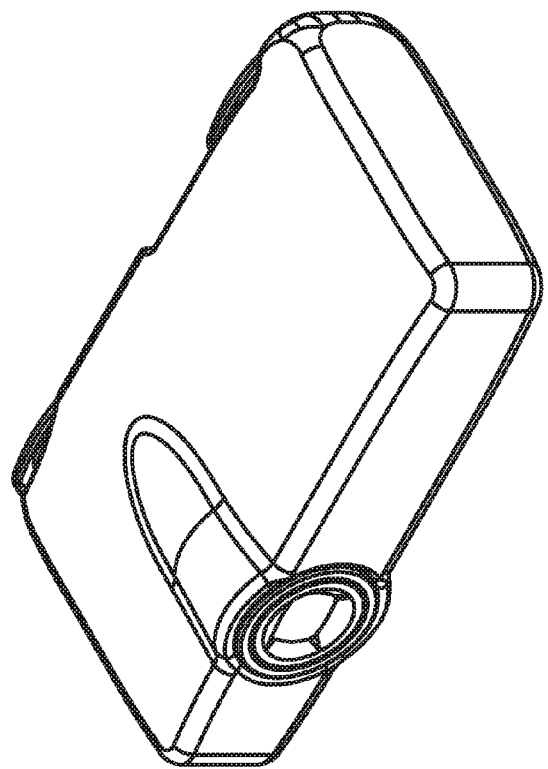

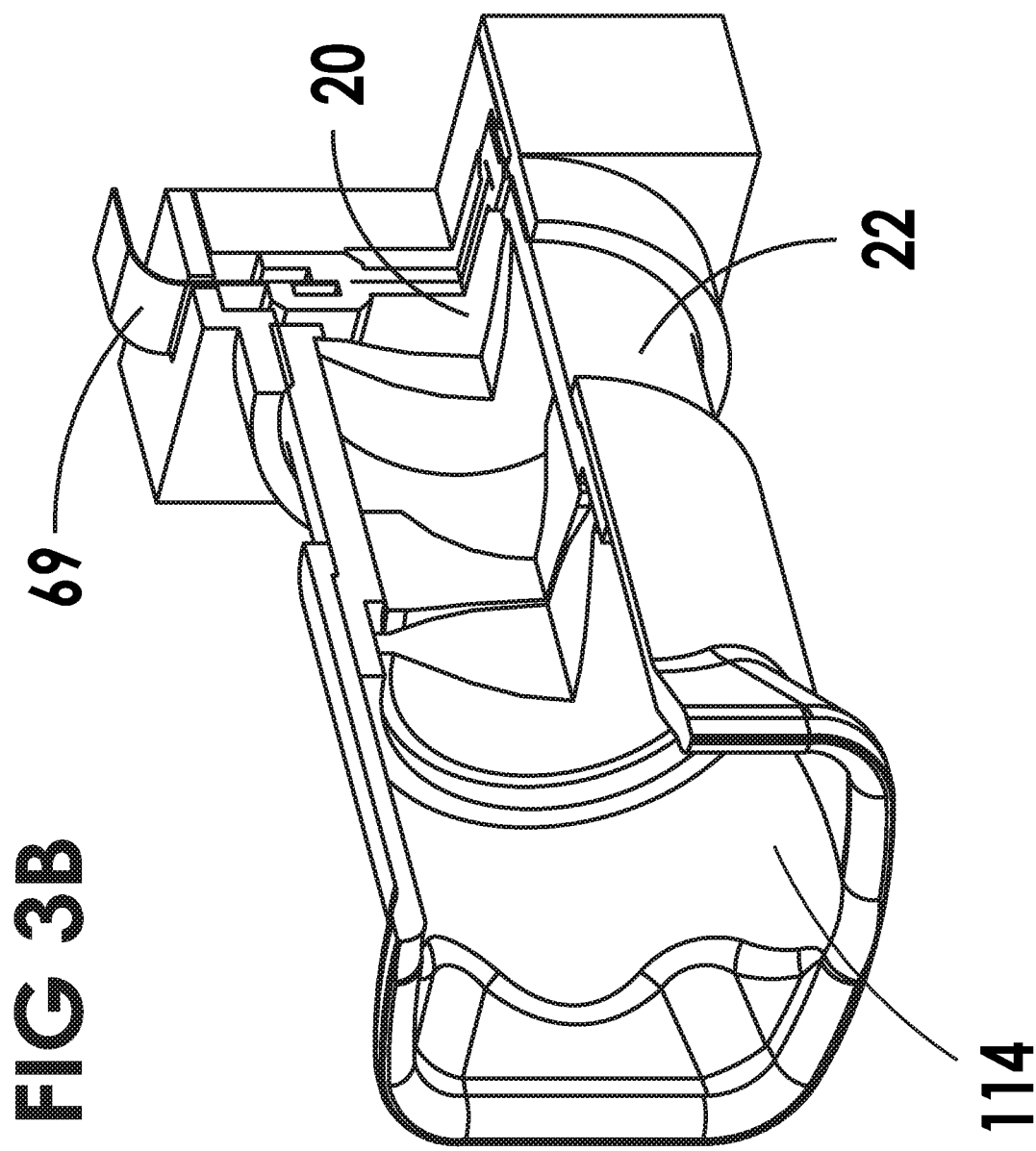

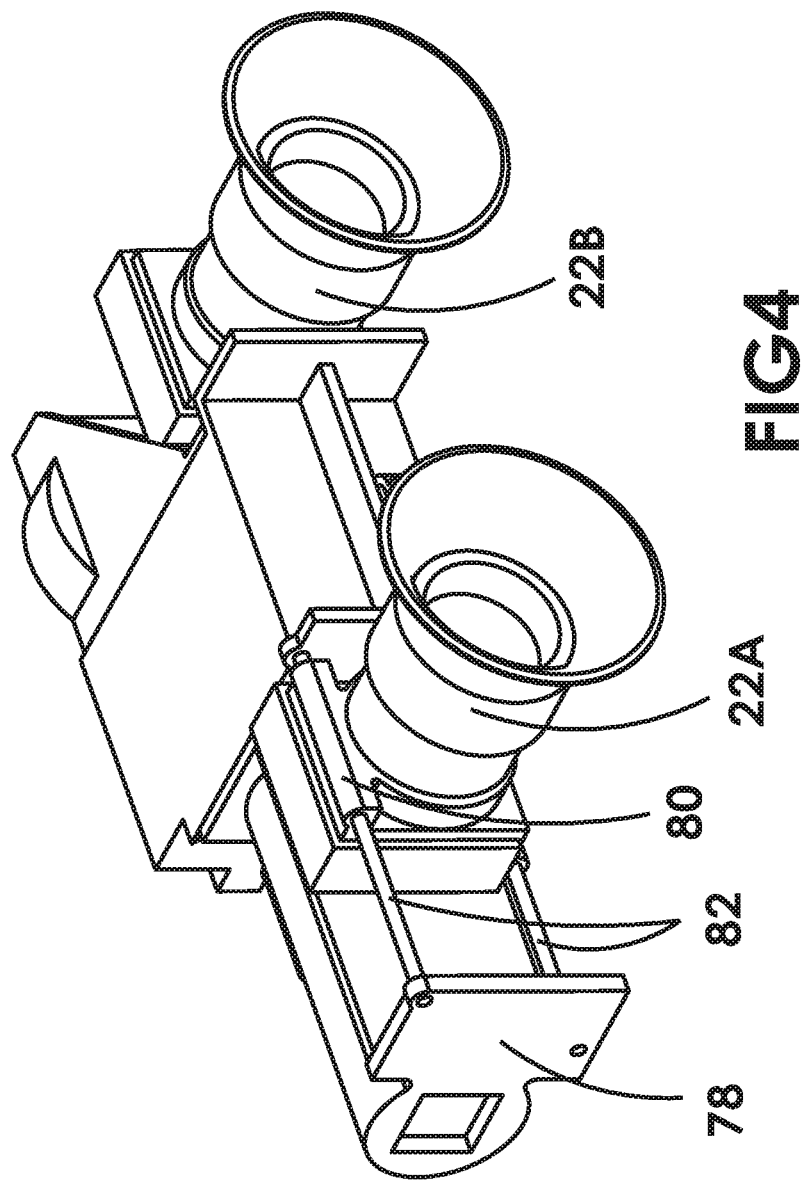

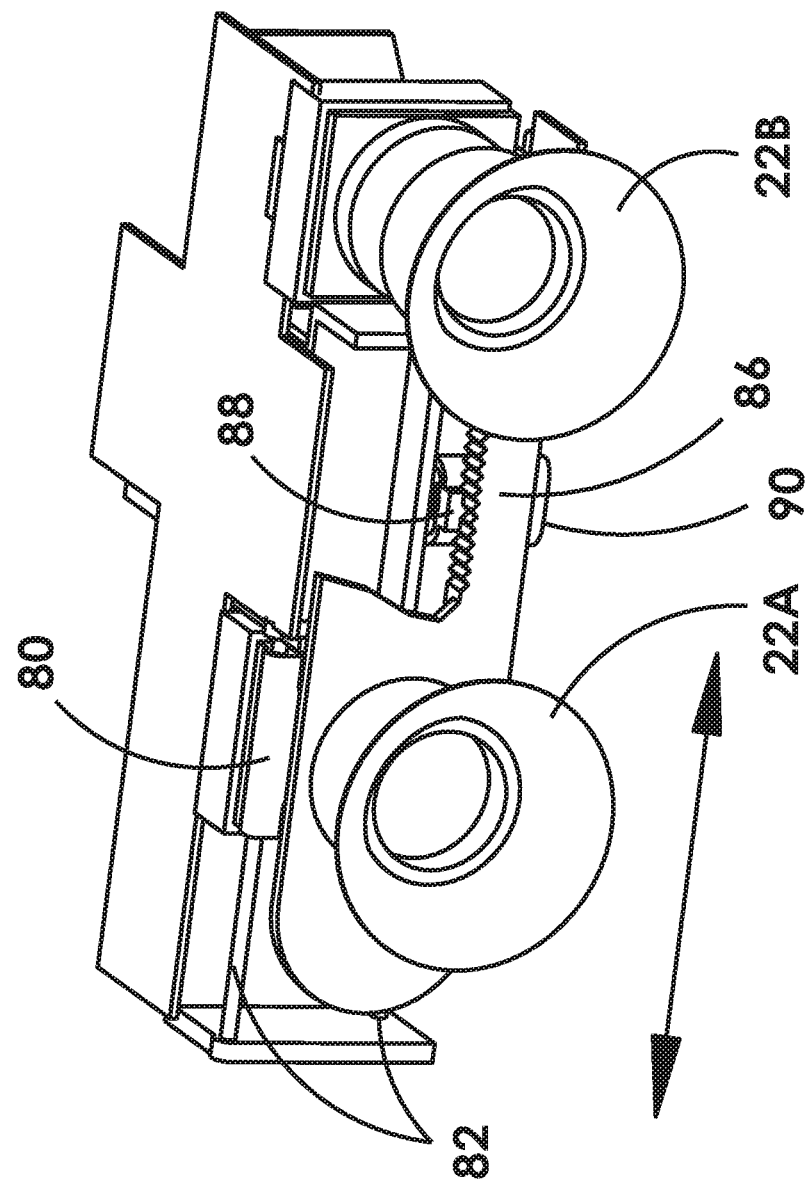

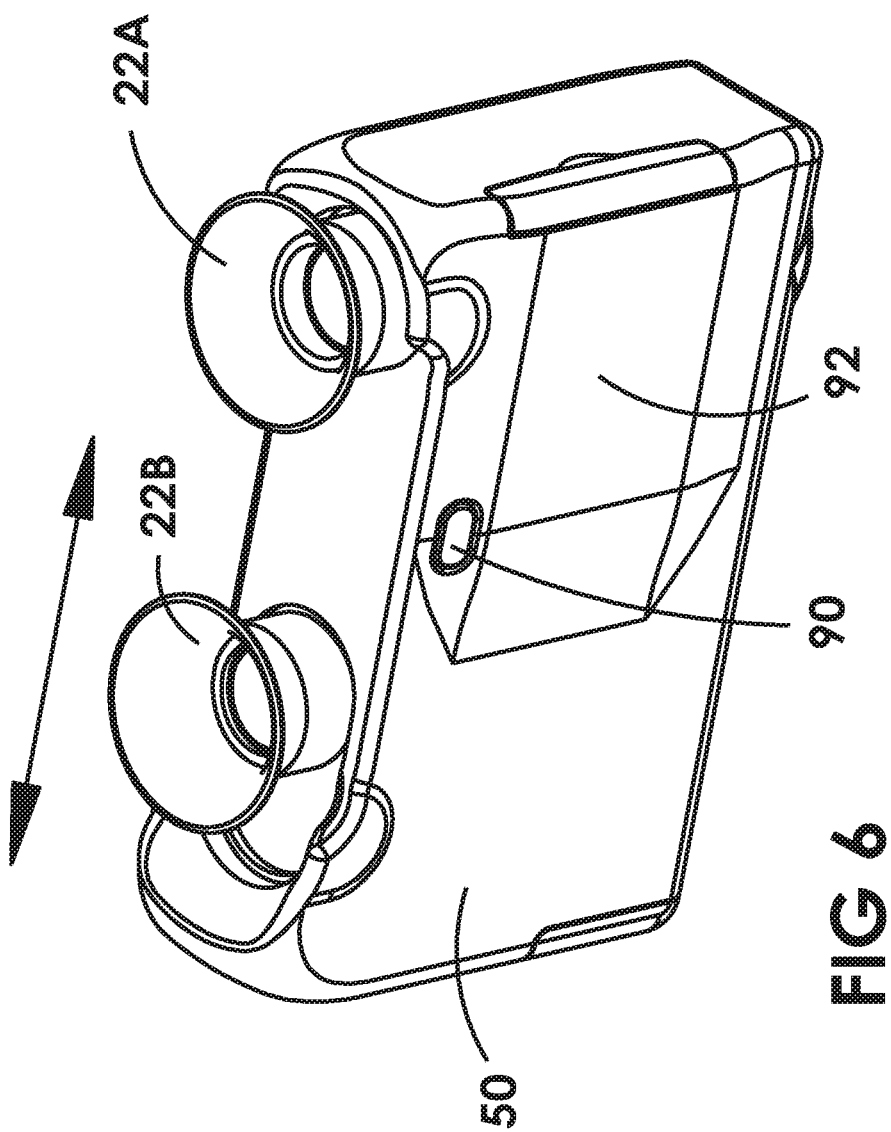

BINOCULAR VIEWING DEVICE

This application is the U.S. national stage of PCT/US2009/065678, filed on Nov. 24, 2009, which claims priority to U.S. provisional patent application Ser. No. 61/118,303, filed on Nov. 26, 2008.

FIELD OF TECHNOLOGY

The present disclosure relates to optical devices for viewing distant objects and in particular to high resolution compact binoculars.

BACKGROUND INFORMATION

Optical devices for viewing magnified images of objects come in many forms, such as binoculars, telescopes and microscopes. Binocular telescope designs date back as far as the 1600's, but it was only with the invention of the modern prism binocular by Ignatio Porro in 1854 that binocular devices could begin to combine the desired features of high magnification, high resolution and compact size. Although numerous design developments have optimized aspects of these features, all have involved functional trade-offs whereby compact size can only be achieved by sacrificing high resolution, high magnification and ability to view objects in low light conditions.

These design constraints arise from the fact that the exit pupil diameter is ordinarily determined by the diameter of the objective lens unit divided by the magnification of the binoculars' optical viewing system. In order to keep the size of the binoculars compact, the objective lens unit must have a relatively small diameter but this, however, limits resolution and real magnification. Reduced levels of resolution and magnification are undesirable because the purpose of binoculars is to discern the details of distant objects by using high magnifications. Although it is possible to design a lens system with a small objective (e.g., 20 mm or less) and a high theoretical magnification (e.g., more than 10× power), the resulting system would have an exit pupil of less of than 2 mm which is acknowledged in the art as a design limitation for all optical instruments. An exit pupil size below 2 mm will have degraded performance due to diffraction, dimness and low contrast. Such systems are usually classified as having "empty" magnification because the viewer does not benefit from the higher magnification when it exceeds the resolving power of the human eye (which for purposes of this invention will be defined as 120 arc seconds). Accordingly, a compromise has been made between the size of the exit pupil and the amount of magnification provided to the user.

This design compromise is evident from a survey of commonly available binocular devices: at fixed magnifications of 10× power and above the smallest objective diameter is at least 21 mm and devices with higher magnification have objective diameters which are significantly larger. For example, the typical 12× magnification high resolution binocular has an objective diameter of at least 32 mm in order to achieve adequate resolution and low light viewing capability. Due to the larger diameters of the objectives of these devices, they are too large to be considered compact. As a comparison, a modern Bushnell® binocular model promoted as "compact" (the IMAGE VIEW™ Digital Imaging Binocular) is manufactured with only 8× magnification and a 21 mm objective.

Recently, efforts have been made to provide optical devices with digital image capture functionality, such as the IMAGE VIEW model mentioned above. These efforts combine an optical viewing system (e.g. binoculars) with a separate digital camera. This arrangement has certain limitations. Most importantly, although the device permits a digital image capture that relates to the image seen by the viewer in the optical viewing system, the design does not change what the viewer actually sees using the device and therefore does not improve in any way the binocular viewing experience. Moreover, because the digital camera has its own optical system, the resolving powers of the optical viewing system and the camera may be different. This difference in resolving power may result in the user electing not to record an image with the camera which the user would have recorded if he/she had seen the actual image the camera was recording.

Another approach that has been used to integrate digital imaging functionality with a binocular device is to record images received by the optical device on a sensor and then redisplay them on a single display which is then viewed by the user. One of the challenges with this approach is to integrate the optical system with the mechanical and electrical components so as to achieve pocketability. In addition, this existing approach alone does not achieve the high magnification and other viewing attributes of a high resolution, high magnification binocular.

SUMMARY OF THE INVENTION

In one aspect, the present disclosure provides an optical device for viewing distant objects. The optical device includes at least one objective system having an entrance pupil diameter $\Phi$ mm and at least one ocular with an exit pupil for observing images from the at least one objective system. The optical device has a magnifying power that is greater than $0.6 \text{ mm}^{-1} \times \Phi$ and the exit pupil of the device is at least 2 mm.

The optical device may also include at least one sensor adjacent to the at least one objective system for detecting images of distant objects received by the at least one objective system and a processor connected to the sensor, the processor for processing the images and recording the images on a first memory component. At least one display may be provided for displaying the images recorded on the first memory component. The at least one ocular may be coupled to the at least one display. To view the images on the at least one display, a user positions at least one of their eyes to the at least one ocular.

In another aspect, the present disclosure provides an optical device optimized for viewing distant objects in low light levels by employing broad spectral range sensors. The optical device includes at least one objective system having an entrance pupil diameter 24 mm>$\Phi$>10 mm and at least one ocular for observing the images from the at least one objective system. The at least one ocular may have an exit pupil diameter $\phi$ satisfying the relationship $\phi$>2 mm. In this configuration, the magnifying power of the optical device may be greater than 12.

In yet another aspect, the present disclosure provides a slide mechanism for adjusting the interpupillary distance between at least two oculars of an optical device. The slide mechanism includes at least one rail and a traveler for sliding along the at least one rail. The traveler may either be attached to or integral with one of the at least two oculars.

In yet another aspect, the present disclosure provides for a folded optical light path whereby the optical light path of the system is additionally minimized for compactness by using a single objective lens system.

In yet other another aspect of the present disclosure, the use of a zoom lens to increase the angular view is provided.

Other aspects and features of the present disclosure will be apparent to one of ordinary skill in the art in light of the following detailed description and drawings depicting one or more embodiments.

BRIEF DESCRIPTION OF THE DRAWINGS

Embodiments will now be described, by way of example only, with references to the attached Figures, wherein:

FIG. 2C is a cross-sectional view of another objective system with a lens barrel which retracts for compact storage.

FIG. 3B is a perspective cutaway view of an inner part of an optical device showing an ocular and display.

FIG. 4 is a perspective view of an inner part of an optical device, showing a slide mechanism for adjusting the interpupillary separation of two oculars;

FIG. 5 is another perspective view of an inner part of the optical device of FIG. 4, showing a slide mechanism for adjusting the interpupillary separation of two oculars;

FIG. 6 is another perspective view of the optical device of FIG. 4, showing a lock button for the slide mechanism of FIGS. 4 and 5;

Like reference numerals are used throughout the Figures to denote similar elements and features.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION

Figure 1:
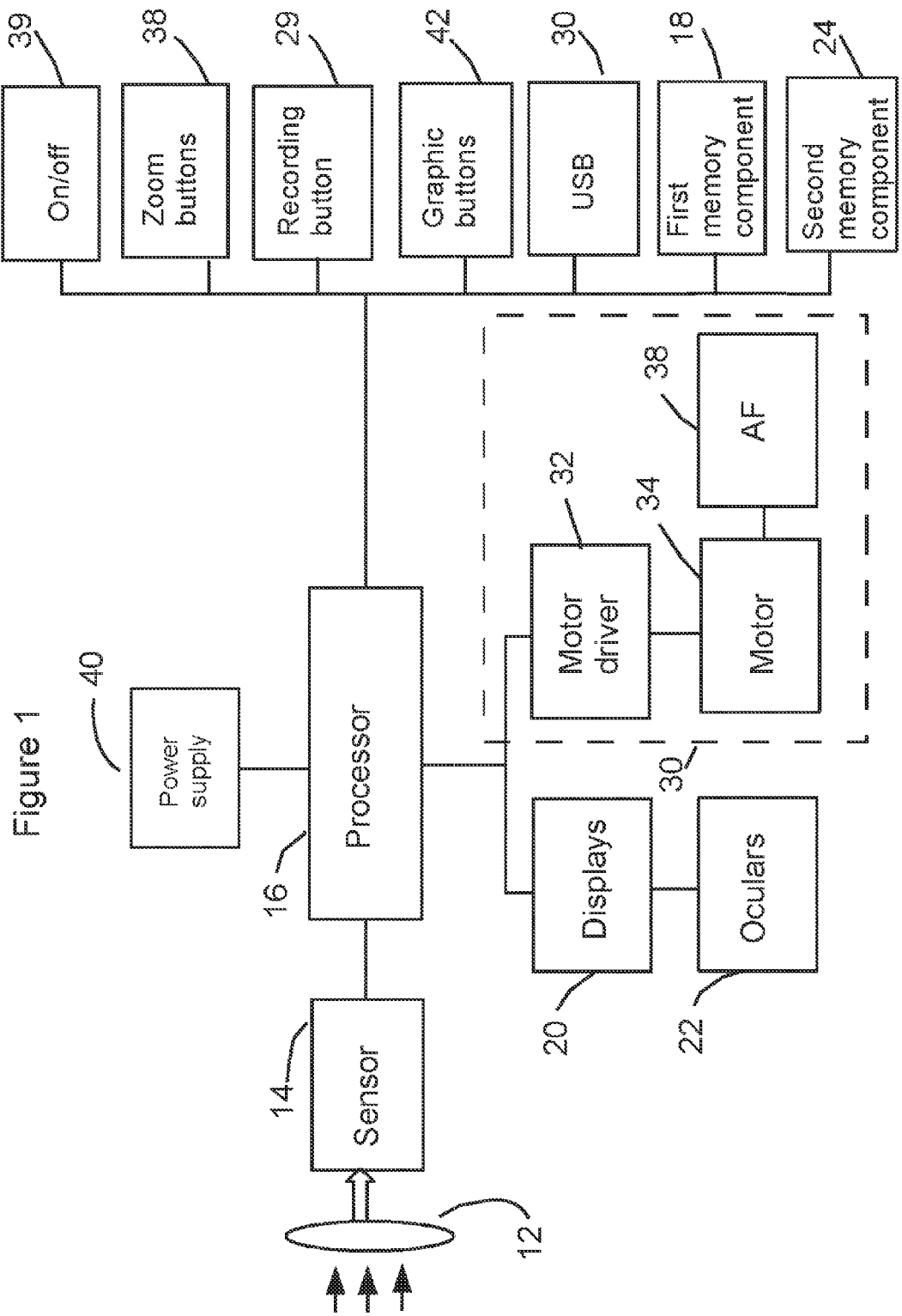
FIG. 1 is a block diagram of an optical device.

FIG. 1 shows a block diagram of an optical device 10 for viewing distant objects to which example embodiments described herein may be applied. The optical device 10 comprises at least one objective system 12 and at least one sensor 14 adjacent to the at least one objective system 12 for continuously detecting images of distant objects received by the at least one objective system 12. The optical device 12 further comprises a processor 16 for continuously processing the images and recording the images on a first memory component 18. Processor 16 may also optionally implement digital image stabilization functionality. The processor 16 is connected to a pair of displays 20 for continuously displaying the images recorded on the first memory component 18. The displays 20 are coupled to a pair of oculars 22 for continuously viewing the images. In order to continuously view the images on the displays 20 a user positions their eyes at the pair of oculars 22 (thus achieving binocular vision). The images displayed on the displays 22 correspond in substantially real-time (as perceptible to the user) to the distant objects, as will be described in more detail below.

The images may be permanently recorded on a second memory component, which may be a flash memory 24. The user may activate a recording function using a recording button 28. The optical device 10 may also be connected to an external device (such as a display or a laptop) via USB port 30 or another suitable interface.

Objective system 12 may be a variable focal length objective system. The focal length $f_0$ of the objective system 12 may be adjusted using a zoom assembly 30 comprising motor driver 32, zoom motor 34 and an autofocus ("AF") unit 36. The focal length $f_0$ may be adjusted by the user using zoom buttons 38. Configurations for variable focal length objective systems will be described in further detail below. The motor driver 32 and autofocus unit 36 may be integrated with the processor 16.

The optical device 10 may further comprise an on/off button 39 and various input/output buttons (e.g., graphic buttons 42).

It should be noted that while the optical device of FIG. 1 is a binocular system, example embodiments described herein may also be applied to other types of optical devices, such as telescopes and microscopes.

Figure 2B:
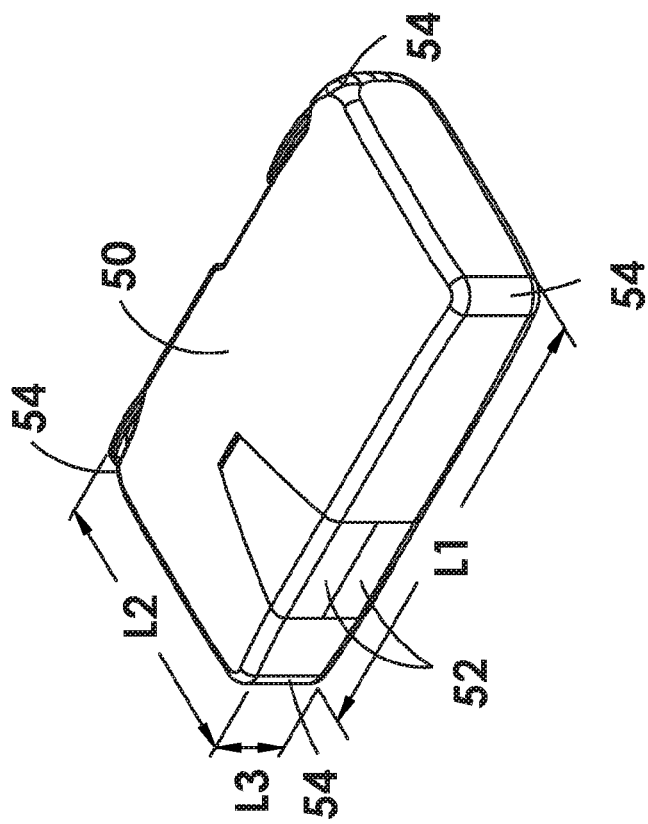
FIG. 2B is a perspective view of an optical device having a variable external envelope in a storage position.
Figure 2A:
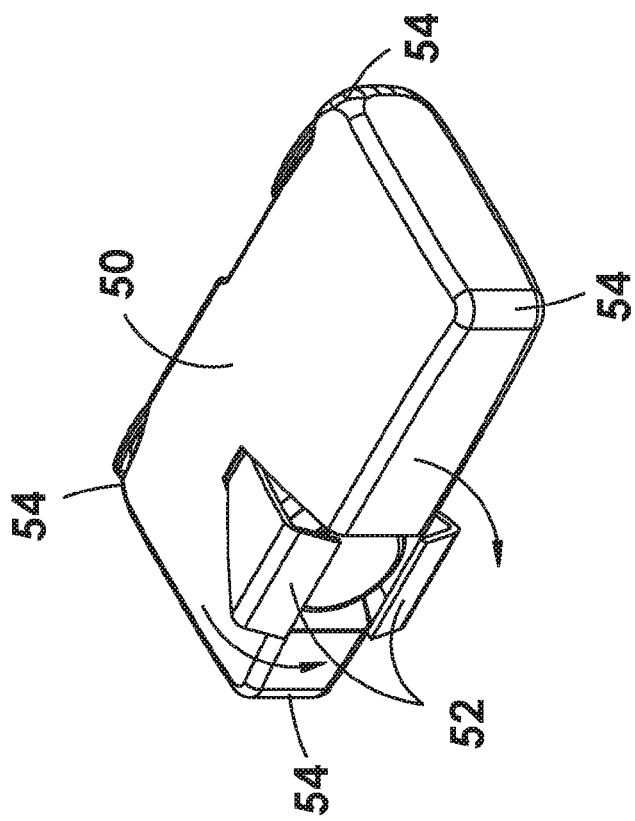
FIG. 2A is a perspective view of an optical device having a variable external envelope in an 'in-use' position.

As illustrated in FIGS. 2A and 2B, the optical device 10 may have a housing 50 with a variable external envelope so that the external faces of the objective system(s) and/or the oculars may be protected by moveable cover 52. FIG. 2A is a schematic of optical device 10 in an 'in use' position with moveable cover 52 in an open position. FIG. 2B is a schematic of optical device 10 in a storage position with moveable cover 52 in a closed position. Depending on the configuration of moveable cover 52, the optical device 10 may have a smaller external envelope when in a storage position than in an 'in use' position. Optionally, optical device 10 may be designed to immediately power down when moved into its storage position. The housing 50 may have rounded corners 54 which make it easier for the user to carry optical device 10 in a shirt or pant pocket.

The housing 50 may have a fixed external envelope. Such a housing would generally be more robust, have greater overall rigidity, and be less complex from a mechanical point of view (and thus less expensive in terms of the number of components that need to be manufactured and assembled). Weatherproofing of a housing 50 that has a fixed external envelope would be easier as the housing 50 will typically have fewer openings that need to be sealed from the environment.

As indicated in FIG. 2B, the dimensions of housing 50 will be referred to as length L1 (the longest side), length L2 (the second longest side, the depth), and length L3 (the shortest side, the height). While the housing 50 could be any size, due to the configuration of optical device 10 (as will be described in more detail below), the housing 50 may be small enough to be "pocketable", i.e. sufficiently small to fit in the pocket of a pair of pants, a shirt, or the like. Specifically, to be pocketable, the length to depth to height ratio (L1:L2:L3) of the housing 50 should be approximately $1.0:0.6 \leqq 0.1:0.25 \leqq 0.1$ (where L1 may be 100-120 millimeters).

The value of L1 should be sufficient to accommodate the interpupillary distance of the user. For example, for an interpupillary distance of 64 millimeters (i.e. the average interpupillary distance for adults), taking into account the dimensions of the eyecups, the housing would have a length L1 of 84 millimeters. However, to accommodate users have larger interpupillary distances, L1 may be approximately 100-120 millimeters, as noted above. In addition, depending on the end use of the optical device 10, the depth of the housing 50 may be of a size that is easily grasped by the user with one or both hands.

FIG. 2C shows an alternate embodiment of a pocketable binocular with a lens barrel 252 that is retractable. The lens barrel provides for a zoom feature.

Figure 3A:
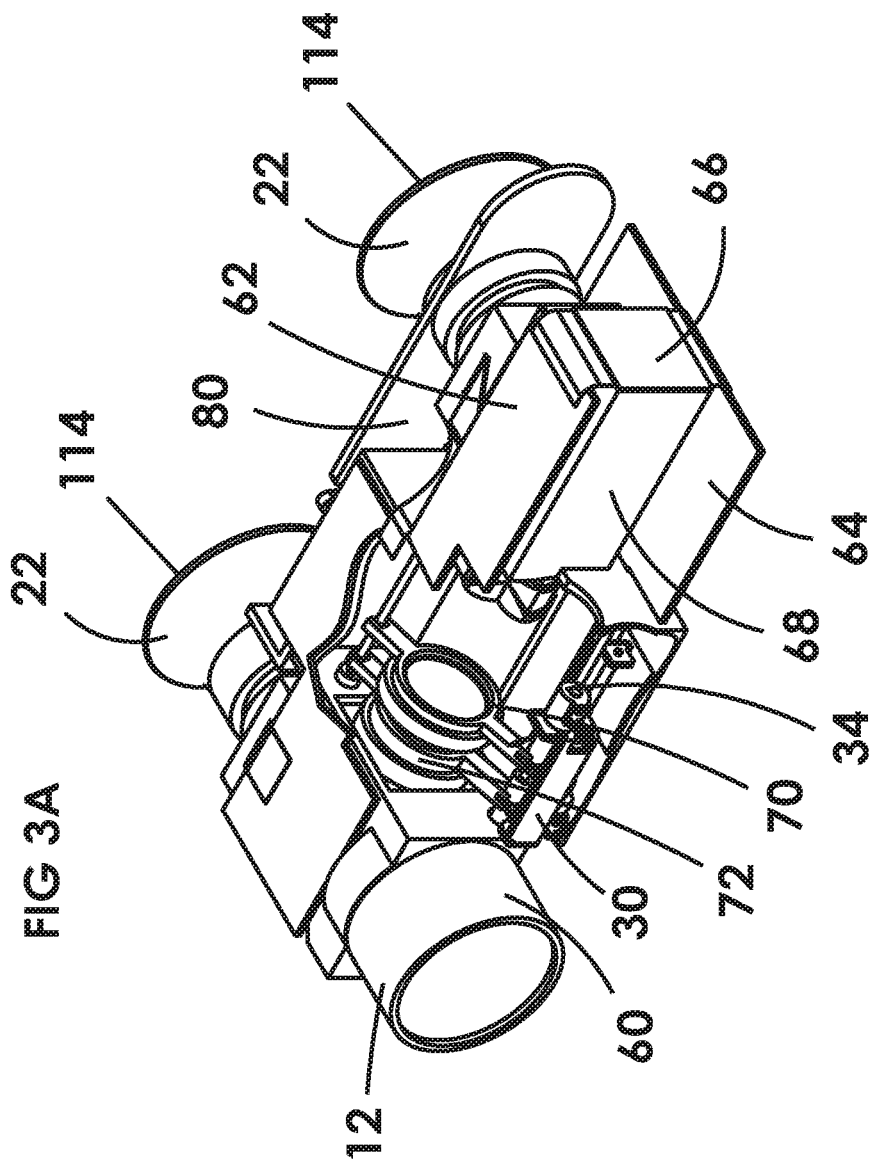
FIG. 3A is a perspective cutaway view of the optical device of FIG. 1.

FIG. 3A is a perspective cutaway view of the optical device of the invention. The outermost portion of objective system 12 may be housed in a barrel 60. Printed circuit boards ("PCBs") 62, 64 and 66 may support the electronics, such as processor 16 and first memory component 18 (not shown). In addition to housing the various electronic components, PCBs 62, 64 and 66 may provide structural support for the optical device 10. It may be convenient to attach sensor 14 (See FIG. 1) to PCB 66 so that sensor 14 is aligned with the optical axis of the objective lens system. PCBs 62, 64 and 66 may also be flexible. Sensor 14 may also be provided within an internal structure 68 in order to secure sensor 14 in proper alignment and position and shield sensor 14 from stray light.

In the cutaway portion of FIG. 3A, various lenses of the objective system 12 are shown. The lenses are housed in lens barrels 60, 70 and 72. As mentioned previously, the lenses may form a variable focal length objective system with the distance between the lens barrels 70 and 72 being adjusted using zoom assembly 30. Zoom assembly 30 may comprise zoom motor 34, zoom motor driver 32 and, optionally, auto-focus unit 36 (shown in FIG. 1).

Interpupillary Adjustment Mechanism

The interpupillary distance between oculars 22 may be adjustable and the adjustment made using a slide mechanism 78 without employing any ocular rotation. Referring also to FIG. 4, slide mechanism 78 may operate to move one ocular 22A with respect to the other ocular 22B. One ocular 22B may be stationary.

As illustrated in FIG. 5, moveable ocular 22A may be attached to or integral with a traveler 80. Ocular 22A may also be attached to one of the displays 20 (shown in FIG. 1) such that they may move together for purpose of interpupillary distance adjustment. Traveler 80 may slide along at least one rail 82 (two rails are illustrated). Ocular 22A may be coupled to a ratchet arm 86 having a series of teeth for engaging a lock mechanism 88 which is attached to any suitable non-moving part of optical device 10. Using lock button 90, the user may engage the lock mechanism 88 and lock the ratchet arm 86 in place at a particular interpupillary adjustment. As illustrated in FIG. 6, the housing 50 may be comprising a slideable projection 92 coupled to the slide mechanism for handling by the user. Movement of ocular 22A is indicated by the double-sided arrow in FIGS. 5 and 6.

Objective System

Figure 7:
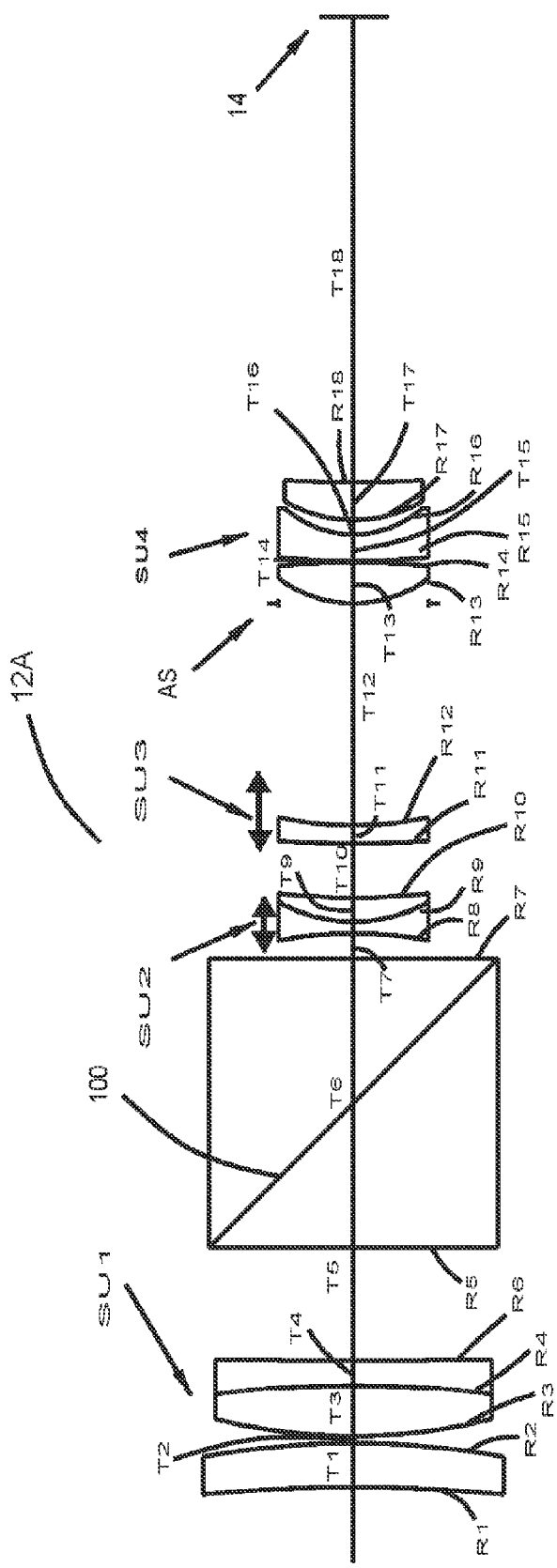
FIG. 7 is a cross-sectional view of an objective system having an adjustable focal length.
Figure 8:
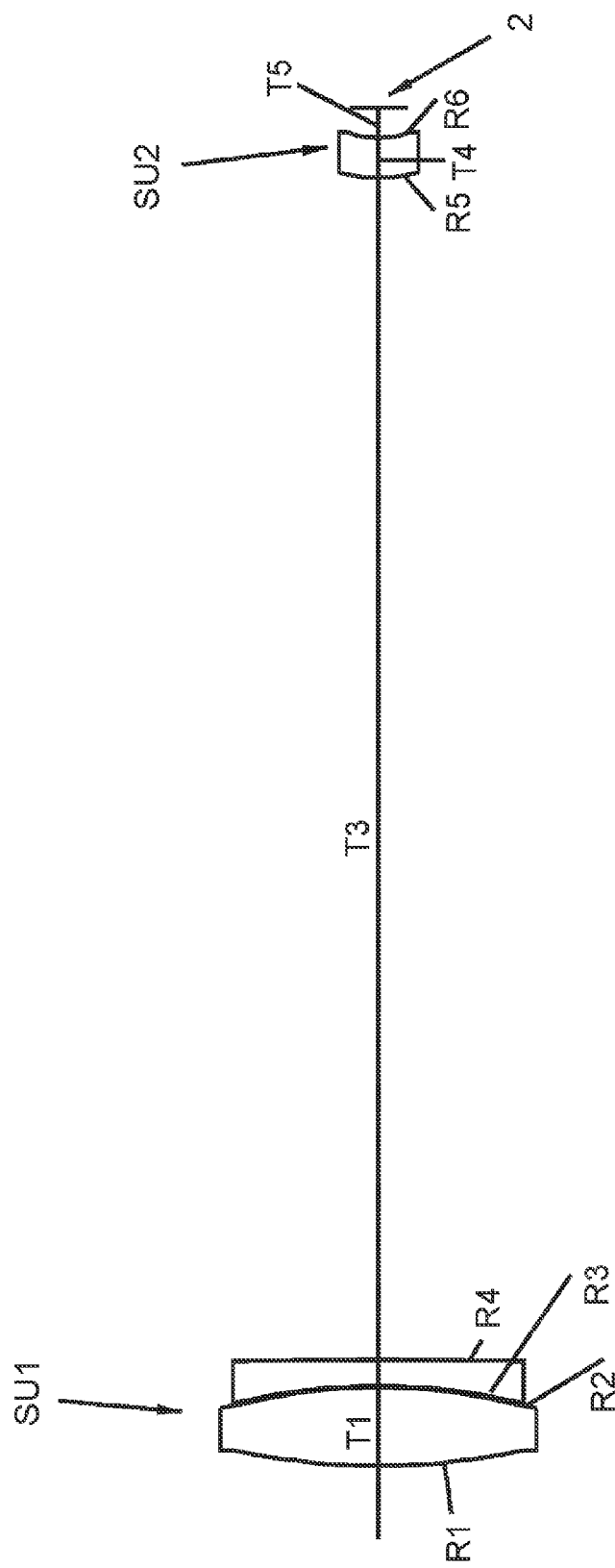
FIG. 8 is a cross-sectional view of another objective system having an adjustable focal length.
Figure 9:
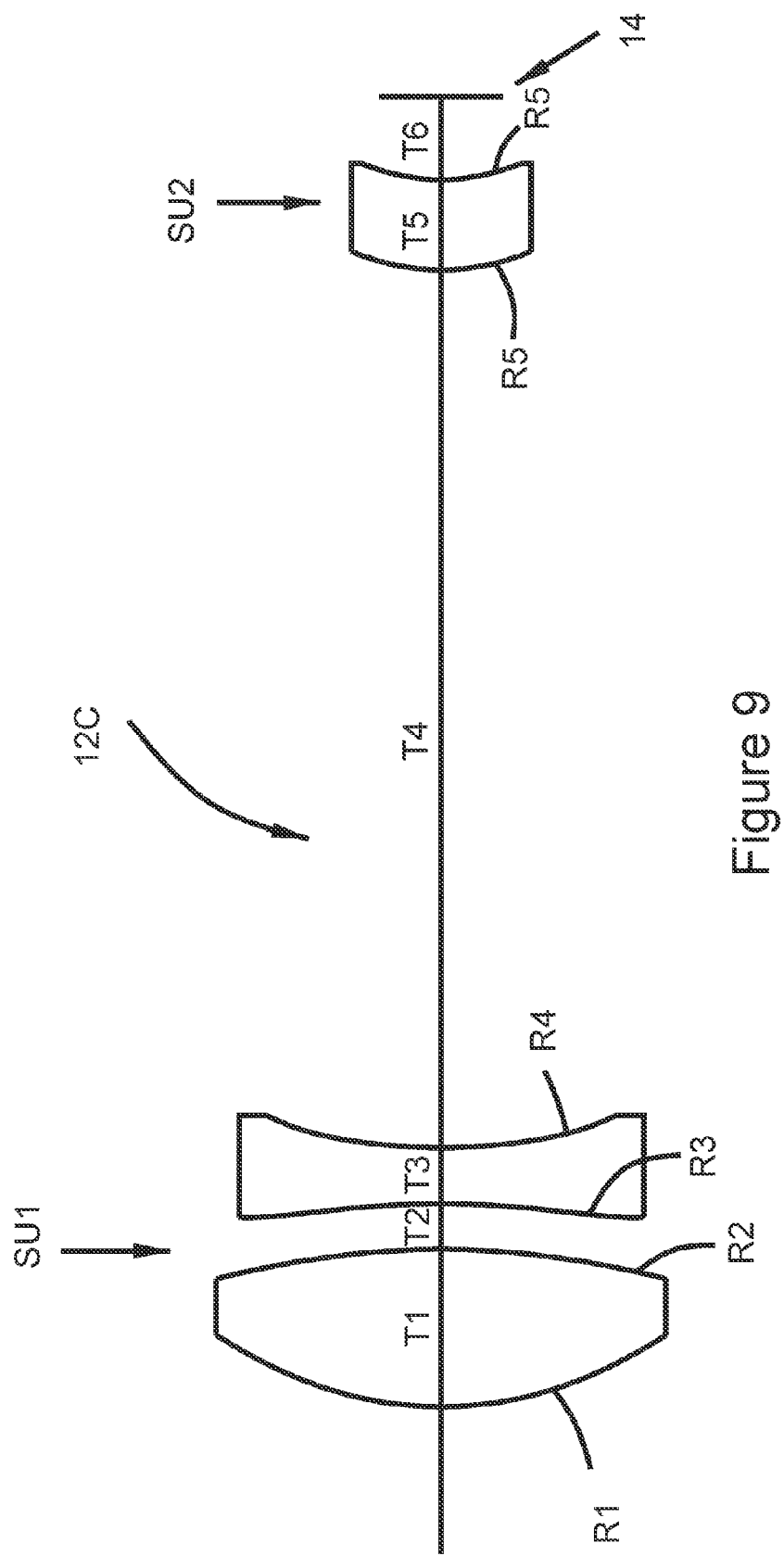
FIG. 9 is a cross-sectional view of an objective system having a fixed focal length.
Figure 10:
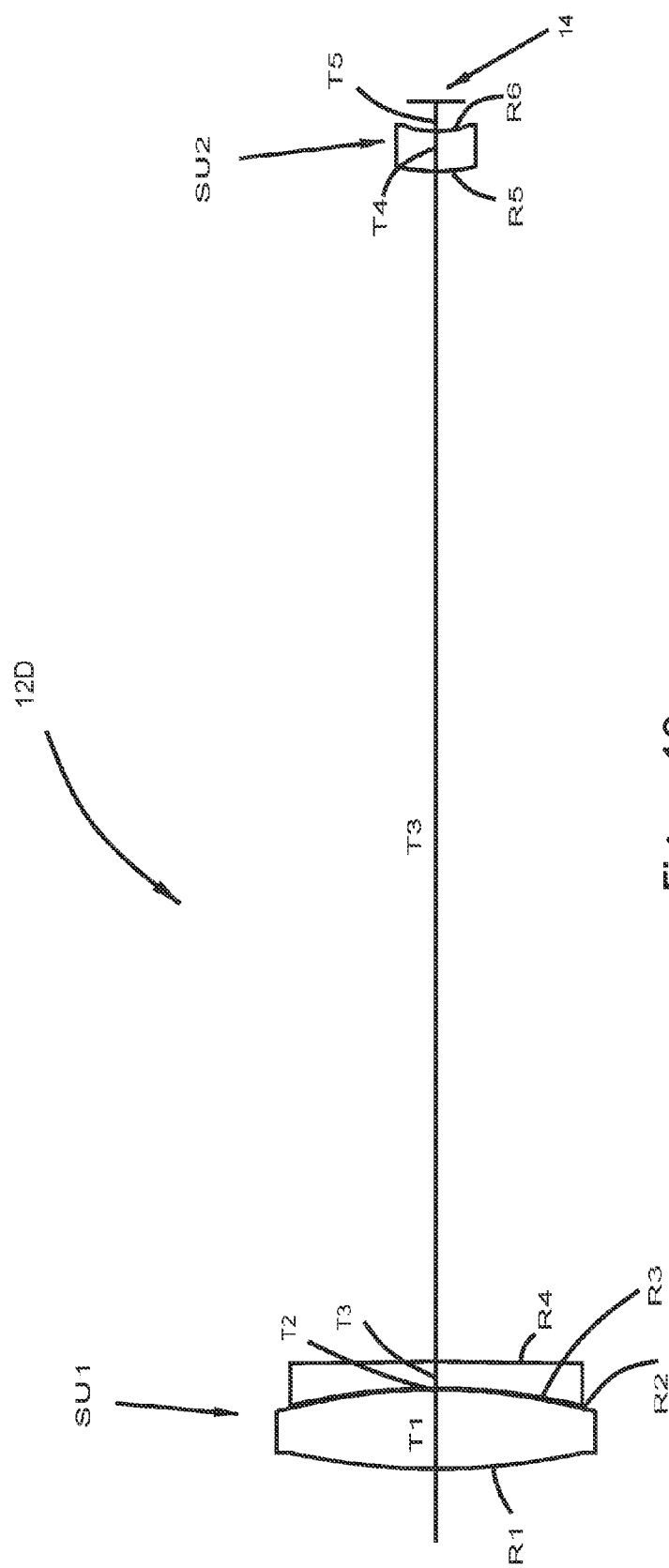
FIG. 10 is a cross-sectional view of another objective system having a fixed focal length.

Objective system 12 can have a number of different configurations, which will now be described with reference to FIGS. 7, 8, 9 and 10. FIGS. 7 and 8 are variable focal length (zoom) systems. The zoom is used to increase the field of view: when the effective focal length of the objective system 12 ("$f_0$") is reduced by zooming to a lower value, the magnification will also be reduced. FIGS. 9 and 10 are fixed focal length systems. As will be seen, the structure of the objective system 12 will depend on whether a fixed or variable focal length is used. The elements may be simple lenses or more complex optical components, as required. Further, the elements may have different dispersions to provide color correction. Various filters, polarizers, coatings and the like may be included.

It should also be noted that one or more of the elements making up the objective system 12 and/or the eyelenses of oculars 22 can have one or two aspheric surfaces. The aspheric lens elements may be made of optical plastic materials or glass materials. The lens elements may be coated and mounted in the objective system 12 using standard techniques and materials.

Referring now to FIG. 7, the objective system 12A has an adjustable focal length and at least four lens subunits, SU1, SU2, SU3 and SU4. The first lens subunit SU1 is on the long conjugate side of the objective system 12A (farthest from the image at sensor 14). Third lens subunit SU3 is moveable between second lens subunit SU2 and fourth lens subunit SU4, thus adjusting the effective focal length $f_0$ of objective system 12A in order to increase or decrease the field of view. A horizontal optical fold 100 may be situated between the first lens subunit SU1 and the second lens subunit SU2 in order to make the optical device more compact. Furthermore, the optical axis of the first lens element of the objective system may be placed in approximate alignment with one ocular.

The prescription data for objective system 12A is set out below in Table 1 (airspace data is provided for $f_0$=48 mm, $f_0$=70 mm and $f_0$=96 mm, where applicable). In Table 1 and the tables that follow, the first column lists the surface number (SRF), the second column lists the radii of curvature in mm of the surface listed in the first column (R1, R2, ... R17, R18), and the third column lists the thickness in mm of the element where the lens vertex intersects the optical axis (or, where applicable, the separation between adjacent surfaces) (T1, T2, ... T13, T14). The fourth column shows the aperture radius in mm. The fifth column lists the medium (e.g. type of glass or plastic, air). It should be noted that the lens elements can be made of a variety of optical materials. Glass optical materials listed under the heading "Medium" in Tables 1-5 below are designated in accordance with Schott North America glass catalog reference numbers. Plastic optical materials are designated in accordance with the reference system used by the OSLO® computer program available from Lambda Research Corporation (www.lambdares.com). Aspheric data in Tables 1-5 is also defined by reference to the OSLO® computer software program.

TABLE 1

| SRF | Radius | Thickness | Aperture Radius | Medium |
|---|---|---|---|---|
| 1 | −134.022347 | 3.500000 | 12.000000 | N-FK5 |
| 2 | −66.869762 | 0.600000 | 12.000000 | |
| 3 | 44.900363 | 4.000000 | 11.000000 | N-FK5 |
| 4 | −98.532699 | 2.000000 | 11.000000 | SF1 |
| 5 | 735.205704 | 9.000000 | 11.000000 | |
| 6 | PRISM | 23.000000 | 11.500000 | BK7 |
| 7 | | 2.000000<br>11.5399<br>17.0629 | 11.500000 | |
| 8 | −31.212220 | 0.922178 | 6.000000 | KZFSN4 |
| 9 | 12.041731 | 1.900000 | 6.000000 | SF11 |
| 10 | 48.873546 | 4.332737<br>2.925700<br>6.8177 | 6.000000 | |
| 11 | 96.711204 | 1.434499 | 6.000000 | N-LAF2 |
| 12 | 27.732382 | 17.656116 | 6.000000 | |
| 13/AST[1] | 9.957155 | 3.300000 | 6.000000 | ACRYL |
| 14 | −47.561655 | 0.099998 | 6.000000 | * |
| 15 | 67.674444 | 2.110721 | 6.000000 | N-SF56 |
| 16 | 8.264259 | 1.145336 | 5.500000 | |
| 17 | 10.896053 | 3.000000 | 5.500000 | N-SF8 |
| 18 | 110.218733 | 37.097739 | 5.500000 | |

| ASPHERIC SURFACE DATA | | | | |
|---|---|---|---|---|
| SRF | AS2 | AS3 | AS4 | AS5 |
| 14 | 7.5958e−05 | −5.2126e−08 | 3.4340e−09 | −8.8983e−11 |

[1]AST = Aperature Stop Position

Referring now to FIG. 8, the objective system 12B has an adjustable focal length and at least three lens subunits, SU1, SU2, and SU3. The first lens subunit SU1 is on the long conjugate side of the objective system 12A (farthest from the image at sensor 14). Second lens subunit SU2 is moveable between first lens subunit SU1 and third lens subunit SU3, thus adjusting the effective focal length $f_o$ of objective system 12B in order to increase or decrease the field of view. An optical fold 102 is situated between the third lens subunit SU3 and the display 14 in order to make the optical device more compact.

The prescription data for objective system 12B is set out below in Table 2. (data is provided for $f_o$=48 mm, $f_o$=70 mm and $f_o$=96 mm, where applicable)

which, in turn, reduces the need for high manufacturing precision for the second lens subunit SU2. If the need for high manufacturing precision is reduced, the manufacturing cost of subunit SU2 is also reduced.

The second lens subunit SU2 may be composed of a single lens element, as shown. In this way, the entire objective system 12C can consist of only three lens elements which makes it inexpensive, light, and easy to assemble.

The effective focal length $f_o$ of the objective system 12C may be in the range of 30 to 90 millimeters. The first lens subunit SU1 may have an effective focal length $f_{SU1}$ which satisfies the relationship $0.75 \leq f_{SU1}/f0 \leq 1.2$. The second lens

TABLE 2

| SRF | Radius | Thickness | Aperture Radius | Medium |
|---|---|---|---|---|
| 1 | −185.493863 | 3.500000 | 12.000000 | NFK5 |
| 2 | −61.098415 | 0.099999 | 12.000000 | |
| 3 | 36.919181 | 4.000000 | 11.000000 | NFK5 |
| 4 | −399.238241 | 2.000000 | 11.000000 | SF1 |
| 5 | 174.670423 | 4.393000 / 13.5160 / 18.5384 | 11.000000 | |
| 6 | −57.690273 | 1.434499 | 7.600000 | N-LAF2 |
| 7 | 83.121582 | 0.999999 / 9.11820 / 22.70330 | 7.600000 | |
| 8 | 126.339052 | 0.922178 | 7.600000 | KZFSN4 |
| 9 | 17.088459 | 1.900000 | 7.600000 | SF11 |
| 10 | 32.333223 | 36.352608 / 19.11640 / 0.50000 | 7.600000 | |
| AST/11 | 18.724780 | 5.562040 | 7.973404 | N-SF56 |
| 12 | 11.296601 | 0.099941 | 7.600000 | |
| 13 | 11.440562 | 3.906431 | 7.600000 | ACRYL |
| 14 | −60.134173 | 56.092347 | 7.600000 | |

SYMMETRIC GENERAL ASPHERE DATA

| SRF | AS2 | AS3 | AS4 | AS5 | AS6 | AS7 |
|---|---|---|---|---|---|---|
| 14 | 3.4546e−06 | −3.4050e−09 | −1.6524e−11 | −6.1780e−11 | 1.3665e−12 | −8.9654e−15 |

Referring now to FIG. 9, the objective system 12C has a fixed focal length and only two subunits, SU1 and SU2. The first lens subunit SU1 is on the long conjugate side of the objective system 12C (farthest from the image at sensor 14). As shown, the second subunit SU2 may be located close to the sensor 14 so that the ratio of (1) the distance T4 between the short conjugate vertex of the second lens subunit SU2 and the location of the light sensing surface of the sensor 14 (the image plane of the sensor) to (2) the effective focal length of the objective lens system $f_o$ is less than or equal to 0.25. This ratio may also be less than or equal to 0.10 or less than or equal to 0.05. Such short distances mean that the beam diameter of the light being transmitted to the sensor 14 is small subunit SU2 may have an effective focal length $f_{SU2}$ which satisfies the relationship $|f_{SU2}|/f_o \geq 3$.

Other constructions for the objective system 12C can be used if desired. For example, the first lens subunit SU1 may have a negative power or a positive power. Where the first lens subunit SU1 has a negative power, the optical path between the long conjugate vertex of the objective system 12C and the image plane of the sensor 14 will typically be longer. If a small overall size of housing 50 is desired, an optical fold may be placed between first lens subunit SU1 and second lens subunit SU2.

The prescription data for objective system 12C is set out below in Table 3.

TABLE 3

| SRF | Radius | Thickness | Aperture Radius | Medium |
|---|---|---|---|---|
| AST/1 | — | 5.000000 | 9.821429 | |
| 2 | 16.497317 | 7.000000 | 10.000000 | ACRYL |
| 3 | −33.622081 | 2.017589 | 10.000000 | |
| 4 | −36.388341 | 2.499490 | 9.000000 | CARBO |
| 5 | 29.842222 | 38.977552 | 7.745273 | |
| 6 | 10.021336 | 4.000000 | 4.000772 | CARBO |
| 7 | 8.573539 | 3.713732 | 3.500000 | |

TABLE 3-continued

CONIC AND POLYNOMIAL ASPHERIC DATA

| SRF | CC | AD | AE | AF | AG |
|-----|-----|-----|-----|-----|-----|
| 2 | 1.0000e−01 | −3.1528e−06 | −5.8704e−08 | −1.7364e−09 | 1.6520e−12 |
| 3 | — | 4.0850e−05 | −4.8393e−07 | 3.4994e−09 | −7.5008e−12 |
| 4 | 2.0000e+00 | 6.1465e−05 | 1.0316e−07 | 2.4163e−09 | 3.4297e−13 |
| 5 | — | 5.8068e−05 | 1.0146e−06 | −6.6718e−09 | 6.2847e−11 |
| 6 | −1.0000e+00 | −1.2009e− | 4.4308e−07 | — | — |
| 7 | — | −2.7874e−04 | −2.7914e−06 | 7.8292e−08 | −6.5106e−09 |

Referring now to FIG. 10, the objective system 12D has a fixed focal length and only two subunits, SU1 and SU2. It is similar in structure to the objective system 12E. The prescription data for objective system 12D is set out below in Table 4.

TABLE 4

| SRF | Radius | Thickness | Aperture Radius | Medium |
|-----|--------|-----------|-----------------|--------|
| 1 | 51.034665 | 6.000000 | 11.000000 | ACRYL |
| 2 | −40.021726 | 0.100000 | 12.000000 | |
| 3 | −43.681862 | 2.000000 | 11.000000 | CARBO |
| 4 | −359.751874 | 89.583534 | 10.000000 | |
| 5 | 11.831102 | 3.000000 | 3.000000 | CARBO |
| 6 | 7.000000 | 2.264967 | 2.500000 | |

POLYNOMIAL ASPHERIC DATA

| SRF | AD | AE | AF | AG |
|-----|-----|-----|-----|-----|
| 2 | 1.0142e−05 | −7.3016e−09 | −1.1127e−09 | 8.6217e−12 |
| 3 | 8.1237e−06 | −2.5569e−08 | −7.0039e−10 | 6.3521e−12 |
| 5 | −6.5855e−04 | 1.3739e−04 | −2.2080e−05 | 1.2593e−06 |

Each configuration of objective system 12 described above can be housed in a pocketable housing 50 (described above). In order to do so, the effective focal length of the objective system 12 may be 40 millimeters $\leq f_0 \leq$ 100 millimeters for a center-to-center pixel spacing of the sensor 14 of 2.4 microns $\leq D_{CC} \leq$ 2 microns. Alternatively, the effective focal length of the objective system 12 may be 30 millimeters $\leq f_0 \leq$ 90 millimeters for a center-to-center pixel spacing of the sensor 12 $D_{CC} < 2$ microns. It should also be noted that where a lens unit having a variable focal length is used, the effective focal length $f_0$ corresponds to the maximum effective focal length $f_0$.

In order to provide a user with maximum field of view and a housing that is of a pocketable size, sensor 14 must have a sufficient number of pixels and/or objective system 12 must be provided with a variable focal length (as in configurations 12A and 12B). The resolution of the objective system 12 at the sensor 14 depends on the size (diameter) of the entrance pupil and the focal length $f_0$ of the objective system 12. Assuming a pixel fill factor of ~100% (i.e. the size of the photodetector of the pixel relative to the size of the surface of the pixel), the entrance pupil diameter Φ of the objective system 12 and the unit's focal length $f_0$ must satisfy the following equation for Raleigh-limited imaging at the sensor:

$$f_0 = \Phi \cdot D_{CC}/1.22\lambda$$

where λ is the wavelength of light, assumed to be 0.550 microns for visual imaging. Thus, for $D_{CC}$ values of between 1.75 and 2.2 microns, typical of sensors having between 1 and 5 megapixels, the effective focal length $f_0$ of the objective system 12 will be less than or equal to 65 millimeters for the 1.75 micron case and 82 millimeters for the 2.2 micron case.

Of course, example embodiments are not limited to $D_{CC}$ values between 1.75 and 2.2 microns.

The field of view 9 for a particular value of $f_0$ is defined as follows:

$$f_0 = h'_0/\tan\theta$$

where $h'_0$ is the height of the image. Thus, the field of view for a particular sensor and maximum resolving power can be determined. If it is desirable to increase the field of view, then a zoom objective lens can be used, whereby the focal length is reduced, the field is increased to a more desirable value.

The entrance pupil diameter Φ of the objective system 12 may be between 10 mm and 24 mm. For a pocketable device, the entrance pupil diameter Φ may be less than 22 mm. To minimize the physical diameter of the objective lens (thus minimizing the maximum clear aperture $CA_{max}$ of the elements of objective system 12), the entrance pupil is placed near the front of the objective system 12. Also, the corners of one or more lens elements of the objective system 12 may be trimmed since the entrance pupil and the exit pupil of the optical device 10 are not linked and thus the user can be provided with a round exit pupil even though the entrance pupil is rectangular. Trimming the corners of one or more lens elements does not significantly reduce the amount of light reaching the sensor.

By selecting $f_0$ so that the objective lens satisfies the Rayleigh criterion for image sensors having more than 1 megapixel, the user will not be able to view all of the image sensor pixels when using typical displays having less than 1 megapixel. However, the resolving power of the objective can be fully exploited by the use of digital zoom. To achieve a desired magnifying power the focal length of the objective, $f_0$ is thus determined:

$$f_0 = f'_d MP/DR$$

where $f'_d$ is the focal length of the eyelens, DR is the quantity display ratio (the ratio of widths of the displays to width of the sensors) and MP is the magnifying power (a measure of how many times larger the image appears to the user's eye). With the configurations described above, a magnifying power of 0.6Φ may be achieved for the optical device 10.

Sensor

Sensor 14 (see FIG. 1) may be a CCD or CMOS sensor or any other suitable sensor. A typical sensor will have an active surface which transforms incoming photons into electrical charges, and suitable electronics for scanning the active surface to obtain a measure of the amount of charge at individual pixels. The sensor may include an array of microlenses on the input side of the active surface to guide the chief rays to the active surface and to improve the fill factor of the individual pixels. The sensor may be supplied with a flexible cable for connection to other components including a power source 40.

For an optical system 10 (See FIG. 1) that is pocketable, the footprint of the sensor may be on the order of 10 mm×12 mm, the thickness of the board and the mounted sensor and its associated electronics and optional microlens array can be on the order of 1.5 mm and, accordingly, the overall volume consumed by the sensor can on the order of 200 mm³. It should be noted that in the interest of reducing the size of the housing 50, the size of pixels may be constrained. Larger pixels gather more light and have lower noise levels, but result in relatively large sensors and large objective systems. Similarly, more pixels give higher resolution and/or wider fields of view, but again more pixels generally mean larger sensors and a larger objective system. The resolution requirements for the displays 20 allow the sensor size to remain relatively small as the pixel size and number of pixel requirements are not constraining. For example, a sensor 14 having a pixel size in the range of 1.7 to 2.2 microns (center-to-center measurement) and a pixel number in the 3-5 megapixel range will produce sufficient resolution for video viewing on displays 20 having a total number of pixels less than that of the sensor 14 as well as high quality JPEG and MPEG outputs for storing in the second memory component 24

The electronic output from the sensor can take various forms. Typically, the output will constitute a series of frames which are temporarily stored in a first memory component 18 (e.g. a DRAM). The frames stored on the first memory component 18 are then read out to the displays to produce a continuous stream of images (i.e. a video) of the distant objects being viewed. It should be noted that while the image being displayed represents a slightly earlier point in time, the time lag will not be perceptible to the user and the video stream will appear as a live stream of the distant objects being viewed.

The number of frames displayed per second needs to be high enough that the user does not perceive image flicker or choppy motion of moving objects. Historically, frame rates for movies have been 24 frames/second and for television have been 25 frames per second. These frame rates can be readily achieved for CCD and CMOS sensors having on the order of 3-5 megapixels under bright light conditions. The frame rate drops as the amount of light on the active surface decreases (and that drop in frame rate would be larger if there are more pixels). In general, a frame rate on the order of 18 frames per second is still acceptable for most users. For very low light conditions, the frame rate can be increased by detecting light in the IR band rather than the visible band.

In order to allow the user to capture a particular image or a series of images for later use, the optical device 10 will typically include user input means (e.g. recording button 26) for signaling the processor 16 that such action is desired. The processor 16 will then signal the first memory component 18 to store the frame(s) received in the second memory component 24. Such storage activity can take place concurrently with the display of images on the displays so that the user's view of the distant objects is not interrupted.

Due to the delay between the reading of frames into the first memory component 18 and the display of images on the displays 20, the selected image or series of images will be somewhat delayed. Once the image capture signal is sent, the processor 16 sends the next frame or frames recorded in the first memory component 18 to the second memory component 24 (the processor 16 does not send the frame being displayed to the second memory component 24). Because of this configuration, the delay is relatively short and, except in the case of a rapidly changing scene, the image recorded on the second memory component 24 will be essentially the same as the image being displayed on the displays 20 at the time the image capture signal is sent to the processor 16. Other configurations for displaying and storing the images may be used.

Display

Referring back to FIGS. 1 and 3B, Displays 20 may be reflective or transmissive microdisplays (transmissive microdisplays are smaller) comprising an LCD panel with a light source located behind the panel. It should be noted that manufacturers of displays (e.g. microdisplays) generally provide a complete system which includes the LCD panel, the light source, and suitable electronics for operating the LCD. The components are mounted on a PCB 66 to form an integrated unit. A flexible cable may extend from the PCB 66 to connect the display 20 to the processor 16 and power supply 40. Alternative arrangements include providing the PCB 66 with a plurality of pins for engagement with a suitable socket mounted within housing 50.

Each display 20 may be provided on a PCB 69 having a footprint on the order of 10-15 mm×15 mm. The thickness of the PCB 69, the display 20, the associated electronics and light source can be on the order of 7 mm. Accordingly, the overall volume consumed by an individual display can on the order of 1000-1500 mm³. As such, the display 20 may only occupy on the order of 1-2 percent of the entire volume of the housing 50 (two displays occupying on the order of 2-4 percent of the volume of housing 50).

Microdisplays are available in various formats and resolution levels such as SXGA, SVGA, WVGA, VGA, WQVGA, and QVGA displays. In general, QVGA and WQVGA displays are smaller and less expensive than the other formats, with the QVGA displays being the smallest and the least expensive and suitable for use in the optical device 10. However, other formats can be used if desired and for some applications, may be preferred, e.g., WQVGA and WVGA may provide benefits for optical devices 10 designed for specific applications, such as, the viewing of sporting events. The output from the processor 16 to the displays may be in VGA format that is not at full resolution because that resolution would be lost on the display, however, full resolution may be stored to the second memory component 24.

Oculars

Figure 11:
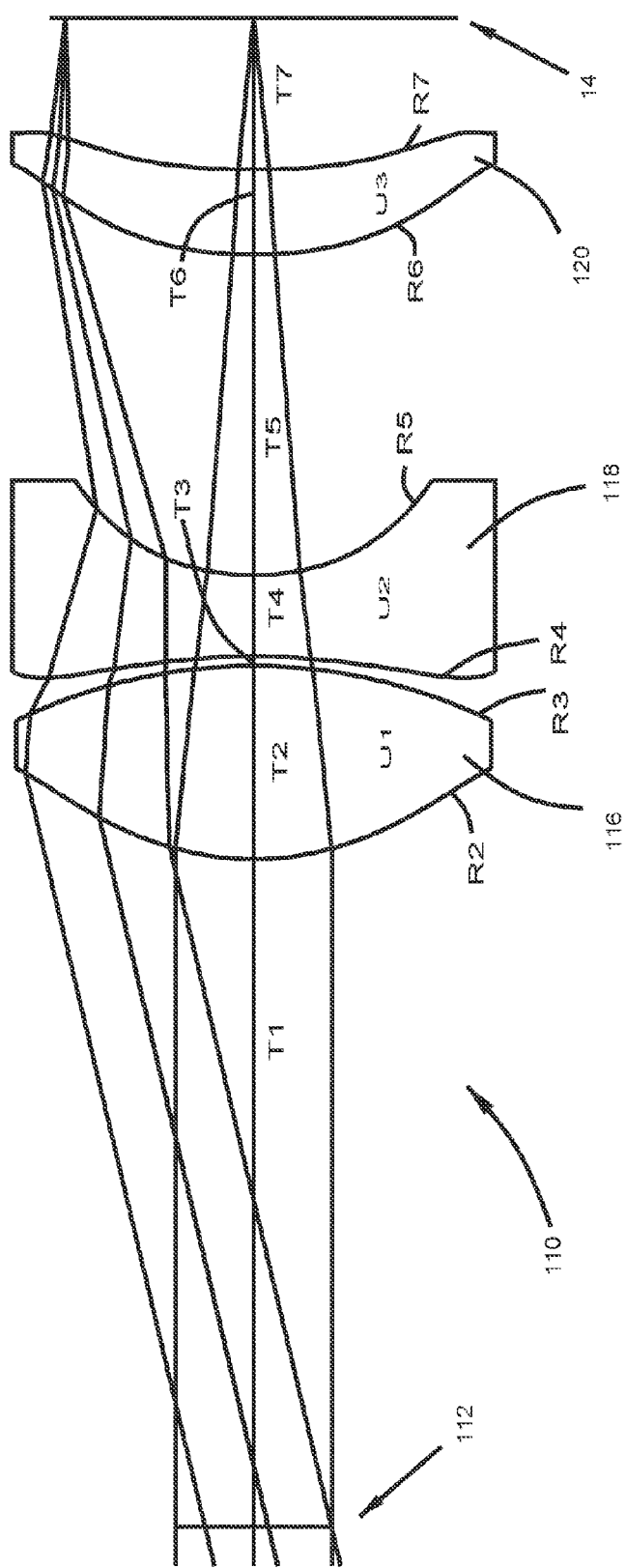
FIG. 11 is a cross-sectional view of an ocular.

Referring now to FIG. 11, each of the oculars 22 may comprise a small eyelens 110 for observing the displayed images with the human eye. Eyelens 110 comprises at least three elements, 116, 118 and 120. Eyelens 110 may allow for different focus settings to be used for each eye.

The prescription data for eyelens is set out below in Table 5.

TABLE 5

| SRF | Radius | Thickness | Aperture Radius | Medium |
|---|---|---|---|---|
| Eye (112) | — | 18.000000 | 2.101628 | |
| 2 | 7.773616 | 5.200000 | 6.400000 | M-BACD15 |
| 3 | −14.638043 | 0.262663 | 6.400000 | |
| 4 | −16.077108 | 2.200000 | 6.500000 | CARBO |

TABLE 5-continued

| | | | | |
|---|---|---|---|---|
| 5 | 7.321148 | 8.628211 | 4.800000 | |
| 6 | 12.225716 | 2.299999 | 6.500000 | CARBO |
| 7 | 34.261484 | 4.041389 | 6.300000 | |

CONIC AND POLYNOMIAL ASPHERIC DATA

| SRF | CC | AD | AE | AF | AG |
|---|---|---|---|---|---|
| 2 | 1.0000e−01 | −2.2155e−04 | −4.4916e−06 | 3.6969e−08 | −4.1167e−09 |
| 3 | 2.0000e+00 | 1.0959e−03 | −5.2474e−05 | 1.3735e−06 | −9.3989e−09 |
| 4 | — | 2.0584e−03 | −5.8943e−05 | 1.1789e−06 | 6.7815e−09 |
| 5 | — | 1.3404e−03 | −4.9163e−05 | 1.2657e−06 | −1.6078e−08 |
| 6 | −1.0000e+00 | 1.5838e−03 | −3.3771e−05 | — | — |
| 7 | 1.0000e−01 | −2.2155e−04 | −4.4916e−06 | 3.6969e−08 | −4.1167e−09 |

Referring back to FIGS. 3A and 3B, oculars 22 may also each comprise an eyecup 114 to comfortably position the eye of the user in a suitable position for viewing the displayed images. The eyecups 114 will reduce the effects of ambient light on the image provided to the user. The eyecups 114 will also provide a reference location during use so that the user's eyes are well aligned with the image being viewed. In addition, the eyecups 114 can provide some stabilization during viewing.

The eyecups 114 need to have an outer diameter large enough to extend beyond the user's cornea where it can engage the musculature and/or bone associated with the eye socket. Accordingly, each of the eyecups 114 has a diameter at its user-engaging surface of approximately 30 millimeters. The eyecups 114 may be collapsible to reduce the external envelope of the optical device 10.

Oculars 22 have a number of associated design constraints that take into account the characteristics of the displays 20 as well as the properties of the user's eye. The primary variables regarding the displays 20 are: (1) its width and height which establish the field of view which the ocular 22 need to have in order to provide an image of the entire display to the user's eye and (2) the direction and angular spread of the light emitted from the display which determines where the entrance pupil of the ocular 22 needs to be and how large an angular spread the entrance pupil needs to encompass.

For a typical microdisplay, the entrance pupil of the ocular 22 needs to be telecentric or near telecentric. For a telecentric or near telecentric entrance pupil, the distance between the entrance pupil and the vertex of the lens element closest to the display 20 needs to be at least 5 times the effective focal length of the ocular 22 (at least 10 times the effective focal length $f_o$ of the ocular 22 is even better).

Also for a typical microdisplay, the angular spread of the light emitted from individual pixels on the order of ±6° (corresponding to an f-number of 5) and thus the entrance pupil of the ocular 22 may have a corresponding angular spread in order to maximize the light provided to the user. A larger angular spread for the entrance pupil of the ocular 22 provides no advantage. It should be noted that having a smaller angular spread for the entrance pupil of the ocular 22 results in a smaller exit pupil for the ocular 22. A smaller exit pupil can be tolerated to some extent, especially for microdisplays which have a high enough illumination so as to cause the user's pupil to contract. However, it is more difficult for the user to align the pupil of his/her eye with a smaller exit pupil.

The ocular 22 may provide eye relief (i.e. distance between the vertex of the lens element nearest the eye and the ocular 22's exit pupil) so that the user can place the entrance pupil of his/her eye (i.e., essentially the surface of the user's cornea) at the exit pupil of the ocular 22 without undesirable engagement between the user's eyelashes or spectacles and the body of the optical device 10. For example, for an optical device 10 equipped with eyecups, the exit pupil of the ocular 22 needs to be at a location where the eyecups appropriately engage the user's spectacles or eyesocket, i.e., close enough to allow the eyecups to provide stabilization of the optical device 10 relative the user's face but not so close as to become physically annoying to the user during viewing.

In order to produce high contrast images of the displays 20, aberrations from the oculars 22 may be corrected. The level of aberration correction, however, does not need to be any better than the pixel size. The modulation transfer functions (MTFs) may be above 20% at ½ $D_{CC}$ and over 60% at 1/$D_{CC}$.

Oculars 22 may use refractive elements or a combination of refractive and diffractive elements. For example, oculars 22 may have a structure similar to the oculars used in standard telescopes. It should be noted, however, that such oculars typically have numerous lens elements, limited eye relief, inadequate field curvature correction, and/or poor image quality.

As illustrated in FIG. 11, eyelens 110 may only have three lens elements. Such a configuration can provide excellent image quality, low field curvature, and large eye relief provided that the lens elements have a +−+ arrangement (i.e. provided that the first and third lens elements have a positive power and the second element has a negative power). The positive lens element 116 closest to the user's eye primarily provides magnification, the negative lens element 118 primarily provides correction of chromatic aberrations and field curvature, and the positive lens element 120 closest to the display 20 primarily provides eye relief and an entrance pupil for the ocular 22 that is located far from eyelens 110, i.e., a substantially telecentric entrance pupil. The positive lens element 120 closest to the display 20 can be an inexpensive lens element since the light passing through the ocular 22 has a small beam diameter at this element. If the eyelens 110 has a positive optical power, a real image of the display 20 will be formed. The eyelens 110 may also have at least some negative optical power in order to correct chromatic aberrations and field curvature.

At least one of the six surfaces of three lens elements 116, 118 and 120 may be aspheric. In addition, three or more of the six surfaces of the three lens elements 116, 118 and 120 may be aspheric. To reduce the cost of the oculars 22 at least two of the three lens elements may be composed of an optical plastic material. The use of plastic elements also facilitates the formation of aspheric surfaces by use of an aspheric mold. The positive lens element 116 nearest to the user's eye may be made of glass to reduce the chances of damage due to scratching, but this lens may also be made of plastic, e.g., plastic coated with a scratch resistant material. Where the positive lens element 116 nearest to the user's eye is plastic, all of the lens elements may be plastic and each lens element may have at least one aspheric surface.

The lens elements of the eyelens 110 may have the following characteristics:

$$f3/fe \leq 0.5 \text{ or } f3/fe \leq 0.4$$

$$|f2|/fe \leq 0.5 \text{ or } |f2|/fe \leq 0.4$$

$$|f2| \leq f3$$

$$f1/fe \geq 0.5 \text{ or } f1/fe \geq 0.75 \text{ or } f1/fe \geq 1.0$$

$$d23/fe \leq 0.1 \text{ or } d23/fe \leq 0.05)$$

$$(d\text{display}+d12+d23)/f0 \leq 1.0 \text{ or } (d\text{display}+d12+d23)/f0 \leq 0.8 \text{ or}$$

$$(d\text{display}+d12+d23)/f0 \leq 0.6$$

where ddisplay, d12, and d23 are evaluated assuming the user's eye is focused at infinity and where fe is the effective focal length of the eyelens 110, f1 is the effective focal length of the positive lens element 120, f2 is the effective focal length of the negative lens element 118, f3 is the effective focal length of the positive lens element 116, d12 is the distance between lens elements 120 and 118, d23 is the distance between the 118 and 116 and ddisplay is the distance between the display and the first lens element 120.

To provide diopter adjustment, ddisplay and/or d12 can be varied. For example, ddisplay may be varied by moving the display relative to the eyelens 110. Alternatively, the ocular 22 may be moved relative to the display 14. d12 may be varied by moving the first element relative to the second and third elements or by moving the second and third elements relative to the first element, or by moving both the first element and the second/third elements relative to one another. The distance d23 may be held constant during diopter adjustment since this spacing is both small and critical to the performance of the eyelens 110.

The diopter adjustment may be performed on one eye at a time, e.g., by providing a test pattern on the displays sequentially to each of the user's eyes or by simultaneously providing a test pattern to both eyes with instructions to the user to focus each eye separately. The diopter adjustment may be fixed (locked) once the user has selected the proper setting for each of the displays.

Quantitatively, the ratio of the focal length of the positive lens subunit fPU to the effective focal length of the eyelens 110 fe may satisfy one of the following relationships:

$$fPU/fe > 1.0 \text{ or } fPU/fe > 1.5$$

It should be noted that a positive lens subunit may not be required where the eyelens 110 has a relatively long effective focal length (e.g. greater than about 25 millimeters). In such a case, an eyelens 110 having only two lens elements can be used, which reduces cost but increases the barrel length of the ocular 22 and generally provides an image of relatively low quality.

The above-described embodiments of the present disclosure are intended to be examples only. Alterations, modifications and variations may be effected to the particular embodiments by those skilled in the art without departing from the scope of the disclosure, which is defined by the claims appended hereto.

What is claimed is:

1. An optical device for viewing distant objects comprising:
   at least one objective system having an entrance pupil diameter $\Phi$; and
   at least one ocular having an exit pupil for observing images from the at least one objective system,
   wherein the optical device has a magnifying power that is greater than $0.6 \text{ mm}^{-1} \times \Phi$ and the exit pupil of the optical device is at least 2 mm.

2. The optical device of claim 1, further comprising:
   at least one sensor adjacent to the at least one objective system for detecting images of distant objects received by the at least one objective system;
   a processor connected to the at least one sensor, the processor for processing the images and recording the images on a first memory component; and
   at least one display for displaying the images recorded on the first memory component.

3. The optical device of claim 1, wherein the entrance pupil diameter $\Phi$ is between 24 mm and 10 mm.

4. The optical device of claim 1, wherein a housing of the optical device is pocketable.

5. The optical device of claim 1, wherein the objective system comprises a zoom lens wherein an optical fold lies between the first and second lens subunits.

6. An optical device optimized for viewing distant objects in low light levels, the optical device comprising:
   at least one objective system having an entrance pupil diameter $\Phi$ between 24 mm and 10 mm; and
   at least one ocular having an exit pupil for observing the images from the at least one objective system, the at least one ocular having an exit pupil diameter $\phi$ greater than 2 mm,
   wherein the magnifying power of the optical device is greater than 12.

7. The optical device of claim 6, further comprising:
   at least one sensor adjacent to the at least one objective system for continuously detecting images of distant objects received by the at least one objective system;
   a processor connected to the at least one sensor for continuously processing the images and recording the images on a first memory component; and
   at least one display for continuously displaying the images recorded on the first memory component,
   wherein the at least one ocular is coupled to the at least one display and a user positions at least one eye at the at least one oculars to continuously view the images on the at least one display.

8. The optical device of claim 6, wherein magnifying power of the device is greater than $0.6\Phi$.

9. An eye lens unit having a distant entrance pupil that images an electronic display into the eye, comprising: a positive first lens element; a negative second lens element; and a positive third lens element, wherein the following relationships are satisfied:

$$f3/fe \leq 0.5$$

$$|f2|/fe \leq 0.5$$

$$|f2| \leq f3$$

$$f1/fe > 0.5 \text{ and}$$

$$d23/fe \leq 0.1,$$

where fe is the effective focal length of the eye lens unit, f1 is the effective focal length of the positive first lens element, f2 is the effective focal length of the negative second lens element, f3 is the effective focal length of the positive third lens element, and d23 is the distance between the positive third lens element and the negative second lens element.

10. An eye lens unit of claim 9 satisfying the following relationships:

$f3/fe \leq 0.4$ $|f2|/fe \leq 0.4$ $f1/fe > 1.0$ $d23/fe \leq 0.05$.

11. An eye lens unit of claim 9, wherein (ddisplay+d12+d23)/f0≦1.0, where ddisplay is the distance between the display and the positive first lens element, d12 is the distance between the positive first lens element and the negative second lens element, and f0 is the focal length of an objective system.

12. An eye lens unit of claim 9, wherein fPU/fe>1.5, where fPU is the focal length of a positive lens subunit.

* * * * *